United States Patent
Sanguinetti et al.

(10) Patent No.: US 9,772,820 B2
(45) Date of Patent: Sep. 26, 2017

(54) METHOD AND DEVICE FOR OPTICS BASED QUANTUM RANDOM NUMBER GENERATION

(71) Applicant: ID Quantique, Geneva (CH)

(72) Inventors: Bruno Sanguinetti, Geneva (CH); Grégoire Ribordy, Troinex (CH)

(73) Assignee: ID QUANTIQUE, Geneva (CH)

( * ) Notice: Subject to any disclaimer, the term of this patent is extended or adjusted under 35 U.S.C. 154(b) by 195 days.

(21) Appl. No.: 14/937,202

(22) Filed: Nov. 10, 2015

(65) Prior Publication Data

US 2017/0010865 A1    Jan. 12, 2017

Related U.S. Application Data

(63) Continuation-in-part of application No. 14/697,320, filed on Apr. 27, 2015.

(30) Foreign Application Priority Data

Apr. 28, 2014  (EP) ...................... 2940923

(51) Int. Cl.
G06F 7/58  (2006.01)
H04L 9/08  (2006.01)

(52) U.S. Cl.
CPC ............ *G06F 7/588* (2013.01); *H04L 9/0852* (2013.01)

(58) Field of Classification Search
CPC ..... G06F 7/588; G06F 2207/58; H04L 9/0662
See application file for complete search history.

(56) References Cited

U.S. PATENT DOCUMENTS

| 4,833,633 | A | 5/1989 | Morris |
| 5,732,138 | A | 3/1998 | Noll et al. |
| 6,215,874 | B1 | 4/2001 | Borza et al. |
| 6,249,009 | B1 | 6/2001 | Kim et al. |
| 6,393,448 | B1 | 5/2002 | Dultz et al. |

(Continued)

FOREIGN PATENT DOCUMENTS

| EP | 0940010 B1 | 5/2001 |
| EP | 1821196 A1 | 8/2007 |

(Continued)

OTHER PUBLICATIONS

Search Report and Written Opinion for for PCT/EP2016/076200 dated Feb. 8, 2017.

(Continued)

*Primary Examiner* — Thanh Luu
(74) *Attorney, Agent, or Firm* — Arent Fox LLP; Michael Fainberg

(57) ABSTRACT

A method and device for generating random numbers based on an optical process of quantum nature. According to one exemplary aspect, the method includes randomly emitting photons from a light source and absorbing the emitted photons by a photon sensor having a plurality of pixels. Furthermore, respective minimum entropy levels can be calculated for each of the pixels of the photon sensor and a randomness extractor can be associated with each of pixels based on the calculated minimum entropy level of that pixel. After this calibration, the method and device generates a number of high-entropy bits used for generating a random number.

20 Claims, 8 Drawing Sheets

(56) References Cited

U.S. PATENT DOCUMENTS

| | | | | |
|---|---|---|---|---|
| 6,831,980 B1* | 12/2004 | Borza | ............. | G06F 7/588 380/44 |
| 7,284,024 B1 | 10/2007 | Trifonov et al. | | |
| 2003/0131031 A1 | 7/2003 | Klass | | |
| 2010/0030059 A1 | 2/2010 | Otte | | |
| 2012/0045053 A1 | 2/2012 | Qi et al. | | |
| 2013/0136255 A1 | 5/2013 | Brown | | |
| 2016/0328211 A1 | 11/2016 | Nordholt et al. | | |
| 2017/0010865 A1 | 1/2017 | Sanguinetti | | |

FOREIGN PATENT DOCUMENTS

| | | |
|---|---|---|
| EP | 2592547 A1 | 5/2013 |
| GB | 2473078 A | 3/2011 |
| JP | 200970009 A | 4/2009 |
| WO | 01/95091 A1 | 12/2001 |
| WO | 02/091147 A1 | 11/2002 |
| WO | 2008/077833 A1 | 7/2008 |
| WO | 2013/003943 A1 | 1/2013 |

OTHER PUBLICATIONS

B. Sanguinetti et al. "Quantum Random Number Generation on a Mobile Phone" Physical Review X, vol. 4, 031056, Sep. 29, 2014.

A. De et al. "Trevisanis Extractor in the Presence of Quantum Side Information" Nov. 4, 2010, Retrieved from the internet: http://arxiv.org/abs/0912.5512v2.

W. Mauerer et al. "A Modular Framework for Randomness Extraction Base on Trevisan's Construction", Dec. 3, 2012, Retrieved from the internet: http://arxiv.org/abs/1212.0520v1.

Jennewein, Thomas, et al., "A fast and compact number generator," Review of Scientific Instruments, quantum random vol. 17, No. 4, pp. 1675-1680 (Apr. 2000).

Wayne, Michael A., et al., "Low-bias high-speed quantum random number generator via shaped optical pulses," No. 9, pp. 9351-9357 (Apr. 26, 2010). Optics Express, vol. 18.

Rivest, R.L., et al. "A Method for Obtaining Digital Signatures and Public Key Cryptosystems," Communications of the ACM, vol. 21, No. 2, pp. 120-126 (Feb. 1978).

Shen, Yong, et al., "Practical quantum random number generator based on measuring the shot noise of vacuum states," Physical Review A, vol. 18, 063814, 5 pgs., (2010).

Troyer, M., et al., "A randomness extractor for the Quantis device," ID Ouantique Technical Paper on Randomness Extractor, Version 1.0, 7 pgs., (Sep. 2012).

Kerckhoffs, Auguste, "La cryptographie milltaire," Journal des sciences militaires vol. IX, pp. 5-38, Jan. 1883, pp. 161-191, Feb. 1883.

Brushing, marcan, segher, sven, "Ps3 epic fail," 27th Chaos Communication Congress, 134 pgs, (2010).

Lenstra, Arjen K., et al., "Ron was wrong, Whit is right," Cryptology ePrint Archive, 17 pgs., (2012).

Rarity, J.G., et al., "Quantum random-number generation and key sharing," Journal of Modern Optics, vol. 41. No. 12, pp. 2435-2444, (1994).

Saitoh, Yoshiaki, et al., "Generation of Physical Random Number Using Frequency-Modulated LC Oscillation Circuit with Shot Noise," Electronics and Communications in Japan, Part 3, vol. 88, No. 5, 8 pgs., (2005).

Stefanov, Andre, et al., "Optical quantum random number generator," Journal of Modern Optics, vol. 47, No. 4, pp. 595-598, (2000).

Vincent, Ch, "The generation of truly random binary numbers," Journal of Physics E: Scientific Instruments, vol. 3, No. 8, 6 pgs., (1970).

Wei, et al., "Bias-free true random-number generator," Optics Letters vol. 34, No. 12, pp. 1876-1878, (Jun. 15, 2009).

Chirgwin, Richard, "Android bug batters bitcoin wallets," The Register,3 pgs., (2013).

Dorrendorf, Leo, et al, "Cryptanalysis of the Random Number Generator of the Windows Operating System," ACM Trans. Inf. Syst. Secur., vol. 13, No. 1, pp. 1-32, (2009).

Bello, Luciano, "openssl—predictable random number generator," Debian security advisory, 1571-1, 7 pgs., (2008).

Gabriel, Christiani, et al., "A generator for unique quantum random numbers based on vacuum states," Nature Photonics, vol. 4, No. 10, pp. 711-715 (2010).

Abadi, Martin, et al., "Control-Flow Integrity Principles, Implementations, and Applications," ACM Transations on Information and Systems Security,vol. 13, No. 1., Article 4, 40 pgs., (Oct. 2009).

\* cited by examiner

Fig. 1
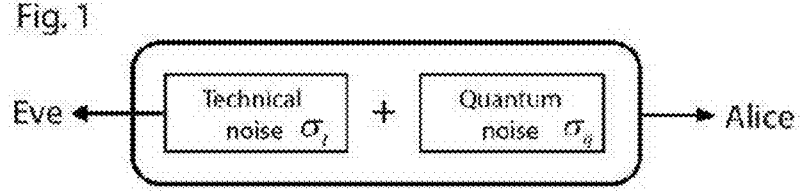
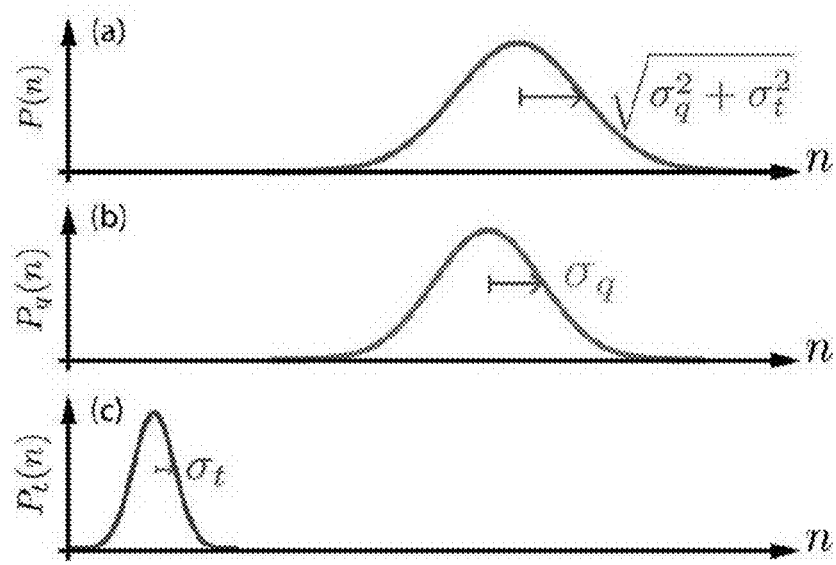
Fig. 2
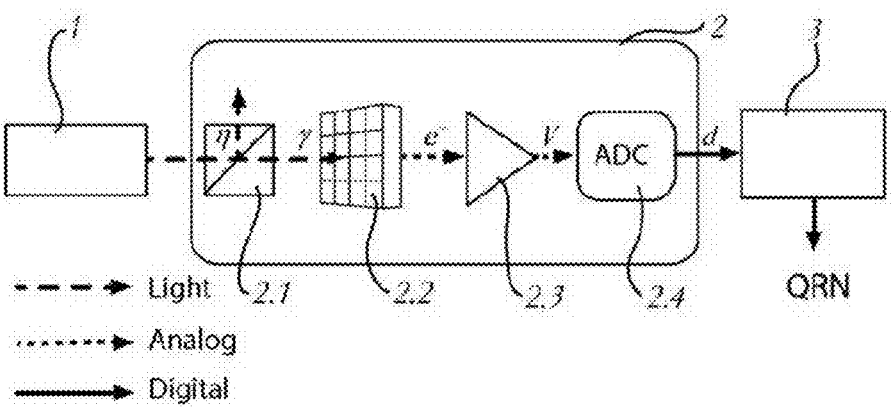

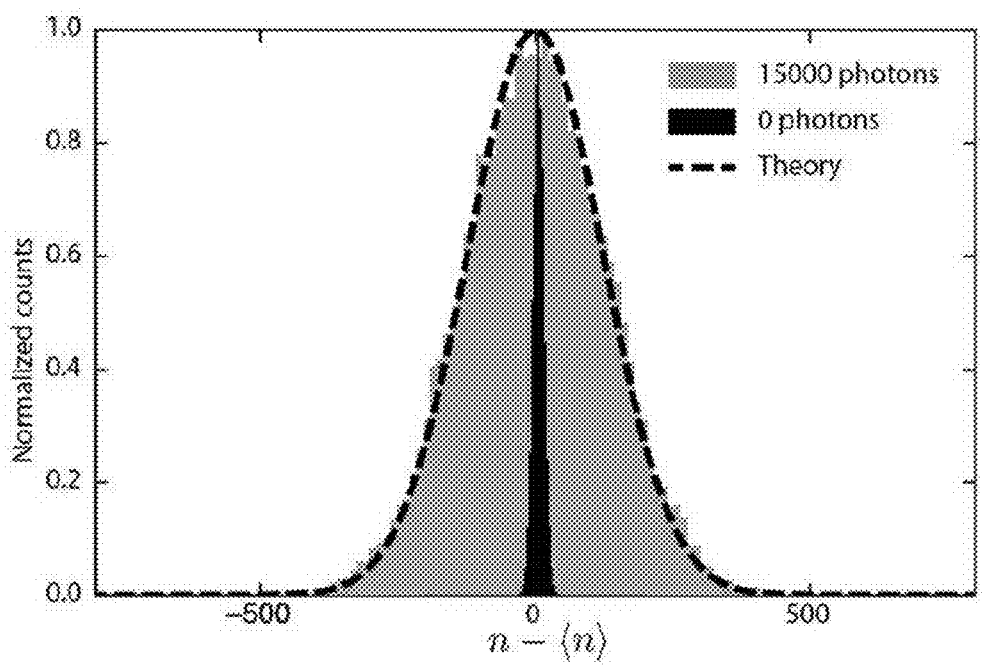
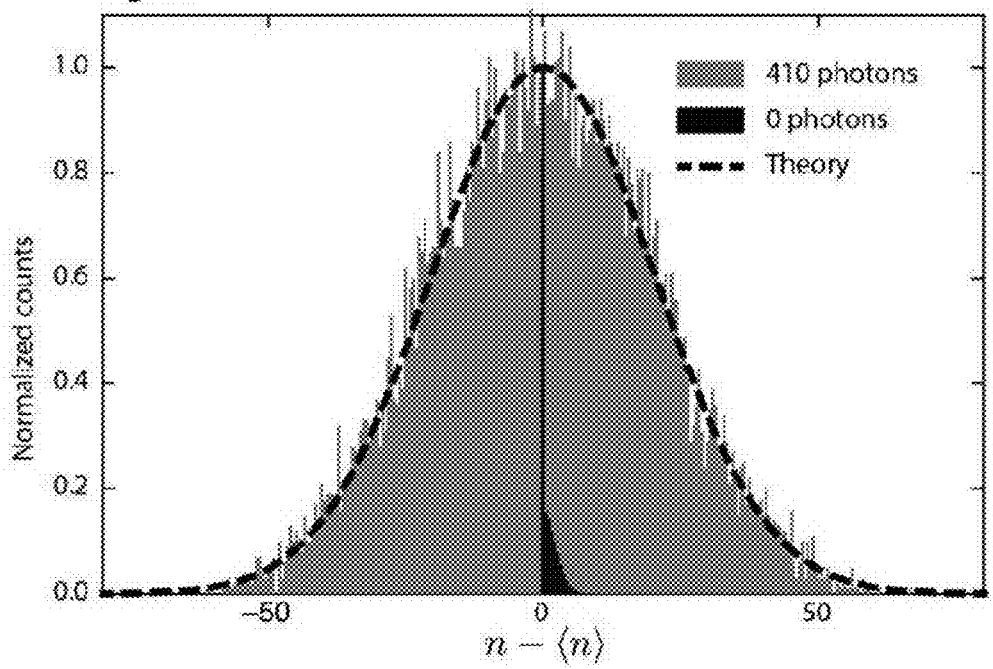

- - → Light
- - - → Analog
———→ Digital

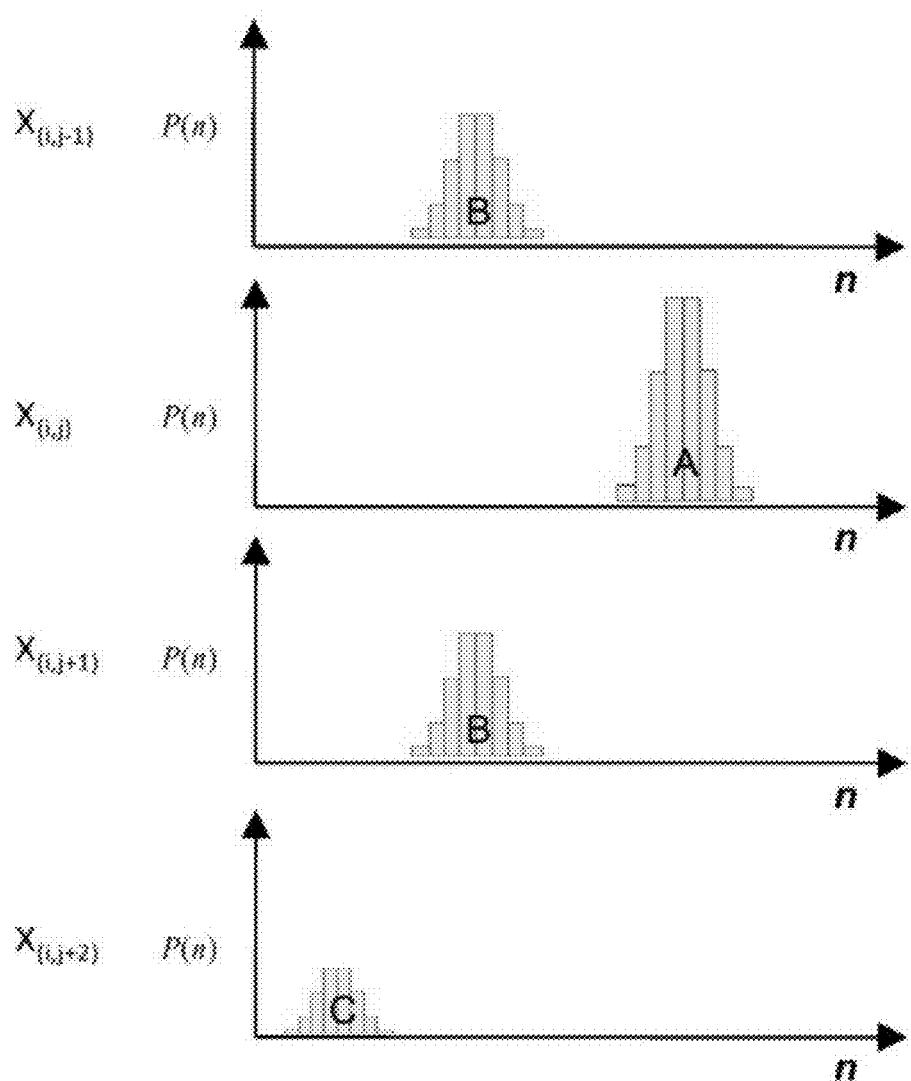

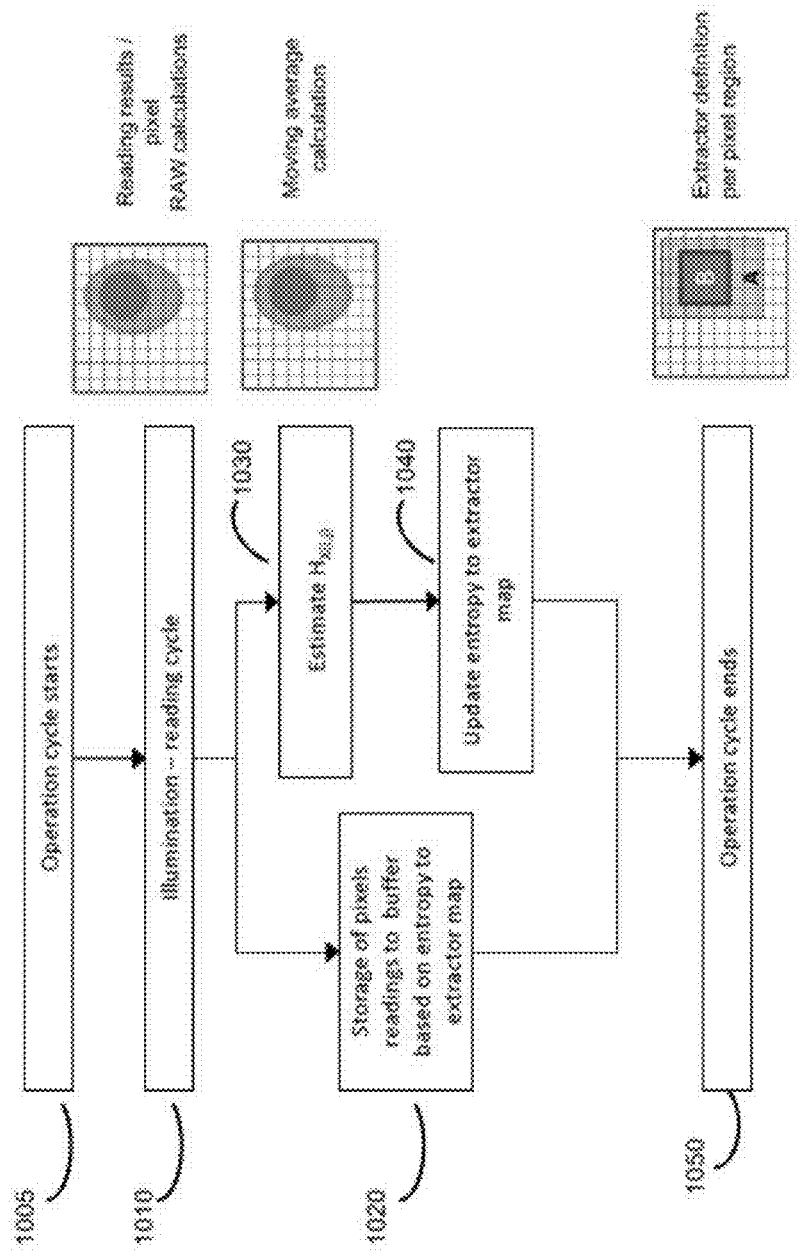

METHOD AND DEVICE FOR OPTICS BASED QUANTUM RANDOM NUMBER GENERATION

CROSS-REFERENCE TO RELATED APPLICATIONS

This application is a continuation-in-part of U.S. application Ser. No. 14/697,320 filed on Apr. 27, 2015, which claims benefit of priority under 35U.S.C. 119(a)-(d) to a European Patent Application No. EP 2 940 923 filed on on Apr. 28, 2014, both of which are incorporated by reference.

FIELD OF TECHNOLOGY

The present disclosure pertains to a device for quantum random number generation based on an optical process of quantum nature comprising a light source emitting photons randomly as well as to a corresponding method, both allowing to obtain random numbers of high quality.

BACKGROUND

In general, the present disclosure is situated in the context of the generation of random numbers. In fact, the generation of high quality random numbers is essential to security of many applications such as cryptographic protocols, both classical and quantum. For example, conventional asymmetric key protocols, like the well known DSA-, RSA- and Diffie-Hellman-algorithms, use random numbers, tested for primality, to generate their keys. Another example is the unconditionally secure one-time pad protocol which needs a string of perfectly random numbers of a length equal to that of the data to be encrypted. The main limitation of this protocol is the requirement for key exchange. Quantum key distribution offers a way to generate two secure keys at distant locations, but its implementation also requires a vast quantity of random numbers. All these examples reflect Kerckhoffs' principle which dates back to the 19th century and states that the security of a cypher must reside entirely in the key.

It is therefore of particular importance that the key used in a cryptographic algorithm is secure, which in practice requires it to be chosen at random. In the past, weaknesses in random number generation have resulted in the breaking of a number of systems and protocols, such as reported by Arjen K. Lenstra, James P. Hughes, Maxime Augier, Joppe W. Bos, Thorsten 5 Kleinjung, and Christophe Wachter in their article "Ron was Wrong, Whit is Right" published in 2012 in the Cryptology ePrint Archive. Such breakings concern many kind of fields like operating system security, see the article "Cryptanalysis of the Random Number Generator of the Windows Operating System" by Leo Dorrendorf, Zvi Gutterman, and Benny Pinkas published in *ACM Trans. Inf. Syst. Secur.*, 13(1):1-32, 2009, communication protocols, see the article "Openssl—Predictable Random Number Generator" by Luciano Bello published in *Debian security advisory* 1571-1, 2008, digital rights management, see the publication "Ps3 Epic Fail" by Bushing, Marcan, Segher, and Sven at the 27th Chaos Communication Congress, 2010, and Financial Systems, see the article "Android Bug Batters Bitcoin Wallets" by Richard Chirgwin published in *The Register*, 2013. Random number generation nowadays thus not only concerns defense issues such as initially targeted by Kerckhoffs' studies but has influence on many other fields like computer technology and science in general, economy, lotteries and games, as well as privacy issues of institutional—or individual's personal data stored or 'encrypted based on protocols using random numbers.

However, high quality random numbers are hard to produce, in particular they cannot be generated by a deterministic algorithm such as a computer program. In fact, existing algorithm-based quasi-random number generators may advantageously be used for simulation purposes, but are not adapted for cryptography, since the resulting quasi-random numbers are, in principle, reproducible. To ensure the uniqueness and, importantly, the randomness of the generated bit string, a physical random number generator is required, such as explained by C. H. Vincent in the article "The Generation of Truly Random Binary Numbers" in *Journal of Physics E: Scientific Instruments*, 3(8):594, 1970, or Y. Saitoh, J. Hori, and T. Kiryu in the article "Generation of Physical Random Number Using Frequency Modulated LC Oscillation Circuit with Shot Noise" in *Electron Comm. Jpn.* 3, 88(5):12-19, 2005.

In the past, two types of physical random number generators have been proposed which exploit the statistical nature of physical processes. Generators of the first type use processes which in principle obey deterministic laws but have chaotic nature due to complexity and incomplete knowledge of the initial system state. As an example, image sensors have been used to generate random numbers of classical origin by extracting information from a moving scene, e.g., a lava lamp, or using sensor readout noise, like disclosed by R. G. Mende, L. C. Noll, and S. Sisodiya in patent U.S. Pat. No. 5,732,138 entitled "Method for Seeding a Pseudo-Random Number Generator with a Cryptographic Hash of a Digitization of a Chaotic System", 1998. Other examples for such kind of physical random number generators are disclosed in U.S. Pat. No. 6,831,980, U.S. Pat. No. 6,215,874, WO2013/003943, EP 1 821 196, WO01/95091. However, the performance both in terms of randomness and throughput of such devices, respectively of corresponding methods, has been low.

Generators of the second type use physical processes which feature some intrinsic fundamental randomness, such as quantum mechanical processes. For this reason, quantum random number generators (QRNGs), which by their nature produce a string which cannot be predicted, even if an attacker has complete information on the device, are of particular interest, like explained in more detail in the article "Quantum Random-Number Generation and Key Sharing" by J. G. Rarity, P. C. M. Owens, and P. R. Tapster, published in *Journal of Modern Optic*, 41(12):2435-2444, 1994. Known QRNGs are based on specialized hardware, such as single photon sources and detectors like disclosed, for example, by A. Stefanov, N. Gisin, 0. Guinnard, L. Guinnard, and H. Zbinden in their article "Optical Quantum Random Number Generator" published in *Journal of Modern Optic*, 47(4):595-598, 2000, photon pair sources in combination with beam splitters such as disclosed by Wolfgang Dultz and Eric Hildebrandt in their patent U.S. Pat. No. 6,393,448 entitled "Optical Random-Number Generator Based on Single-Photon Statistics at the Optical Beam Splitter", 2002, or the device proposed by W. Wei and H. Guo in the article "Bias-Free True Random-Number Generator" published in *Opt. Letters*, 34(12):1876-1878, 2009, or homodyne detection like disclosed for example by Christian Gabriel, Christoffer Wittmann, Denis Sych, Ruifang Dong, Wolfgang Mauerer, Ulrik L. Andersen, Christoph Marquardt, and Gerd Leuchs in their article "A Generator for Unique Quantum Random Numbers Based on Vacuum States" published in *Nat. Photon*, 4(10):711-715, 2010. Other examples for such kind of physical random number generators are disclosed in U.S. Pat. No. 7,284,024, US 2012/045053, JP 2009/070009, EP 2 592 547, GB 2 473 078, and W002/091147. These QRNGs, however, have significant drawbacks, in particular in terms of size and complexity due to the required specialized hardware as well as in terms of speed and scalability, which entails high production cost, respectively limited applicability.

The solutions according to prior art therefore inherently comprise several problems. If known QRNGs indeed produce random numbers of quantum, i.e., random origin, the corresponding devices are complex and cost intensive. Devices which generate random numbers of classical origin have a low performance in terms of randomness and throughput.

SUMMARY

It is an object of the disclosed system and method to overcome the above-mentioned difficulties and to realize a device for quantum random number generation as well as a corresponding method. The device should have reduced size, complexity, and production cost as well as increased scope of applicability as compared to existing devices.

To this effect, the present disclosure proposes a device that achieves the objectives identified above, as well as a corresponding method. In an exemplary aspect, the device for random number generation based on an optical process of quantum nature according to the present disclosure distinguishes by the fact that it further comprises a light detector adapted to absorb the randomly emitted photons and to measure a number n of photons produced by said light source in a time interval T, and a randomness extractor, wherein the detector comprises a photon sensor acting as a photon-to-electron converter, an amplifier for converting the electron signal received from the photon sensor into a voltage and amplifying the voltage signal V, as well as an analog-to-digital converter for treating the amplified signal V received from the amplifier by encoding the amplified signal V into digital values d and sending these digital values d to the randomness extractor for further processing such as to produce quantum random numbers (QRNs) based on said number n of photons produced by the light source in a time interval T.

According to certain aspects of this device, the light source may be chosen as a light emitting diode or a laser diode and the photon sensor may be formed by a CCD camera or a CMOS camera. The camera, respectively in general the photon sensor, is operated in the linear regime where its Fano factor is close to 1, and—for optimal performance—the analog-to-digital converter is tuned such as to have an electron-to-digital conversion factor $\xi$ fulfilling the condition $\xi > 1$.

These and other operating parameters of the camera, of the processing electronics, and of the randomness extractor which are specified in more detail in the following description allow to realize a small size and low cost quantum random number generator which produces high quality random numbers of quantum origin and which may be integrated in number of stationary or mobile apparatuses and instruments.

According to another exemplary aspect of the present disclosure, the device for generating random numbers can include a plurality or family of randomness extractors and the device can be calibrated using these extractors. In this aspect, the device includes a light source that emits photons and a photon sensor with a plurality of pixels that absorbs the photons emitted from the light source. In addition, the device can include a processor with software that calculates respective minimum entropy levels for the pixels of the photon sensor, and based on these calculated entropy levels, matches or associates one of the randomness extractors with each of the pixels. After this calibration process of the device, the extractor associated with the each pixel can generate a number of high-entropy bits for generating a random number.

The disclosure is also related to a corresponding method and computer program means adapted to implement this method.

Other features and advantages of the present disclosure are mentioned in the dependent claims as well as in the description disclosing in the following, with reference to the figures, the system and method in more detail. The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The attached figures exemplarily and schematically illustrate the principles as well as several aspects of the present disclosure. The figures, which are incorporated into and constitute a part of this specification, illustrate one or more example aspects of the present disclosure and, together with the detailed description, serve to explain their principles and implementations.

FIG. 1 schematically illustrates the distribution of probability P(n) that a number n of photons is measured by an image sensor's pixel, said probability being the combination of quantum uncertainty $\sigma_q$ originating from the quantum nature of a light source and technical noise Gt originating from the technical equipment used.

FIG. 2 schematically illustrates the principal components of a device for random number generation according to an exemplary aspect, these components being a light source, a detector, and a randomness extractor, wherein the detector comprises several sub-elements, as well as the operating principle of the device.

FIGS. 5a and 5b show normalized histograms of the photon distributions obtained when using an ATIK 383L CCD camera and a Nokia N9 CMOS camera, respectively, as a detector.

FIG. 7B illustrates a distribution of probability P(n) that a number n of photons is measured by the pixels in the corresponding regions "A", "B", and "C" as shown in FIG. 7A.

FIG. 10 illustrates a method for calibration of the random number generation device according to an aspect of the present disclosure.

DETAILED DESCRIPTION

Figure 3:
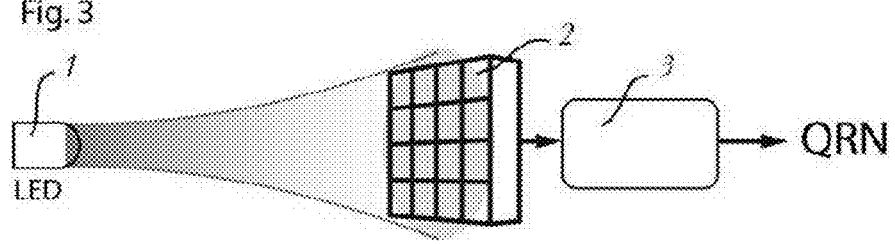
FIG. 3 schematically illustrates an example of a device for random number generation according to an exemplary aspect, the device comprising an LED as a light source, a detector illuminated by said LED, and a randomness extractor which treats the digital output of the detector.

In the following, the exemplary device and method shall be described in detail with reference to the above mentioned figures. Example aspects are described herein in the context of a system, method and computer program product for identifying a path of a computer resource along a tree. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In a first part, the concept of the proposed system, including its various entropy sources and how the entropy of quantum origin can be extracted, shall be described. In a second part, two different exemplary designs of the proposed random number generation shall be exposed. Finally, the results obtained with the help of these random number generators in terms of generated random numbers shall be presented, including tests performed on the generated random numbers.

The concept of the present disclosure relies on the fact that some properties of a quantum state are unknown before measurement as well as fundamentally unpredictable. One such property, used in most known QRNGs, is the path taken by a photon impinging on a beamsplitter. Another such property is the number of photons produced by a light source in a time interval T. It is the latter effect which is used in the context of this disclosure. In fact, most light sources emit photons at random times or emit a random number of photons at a time. For ease of the language, both of these effects shall in the further course of the description be embraced by the wording that such light sources emit photons randomly. In any case, it is impossible to predict the number of photons emitted per unit time. This quantum effect is usually called "quantum noise" or "shot noise" and has been shown to be a property of the light field rather than a technical limitation of the light source or of the detector, see e.g., the article "Experimental Realization of Sub-Shot Noise Quantum Imaging" by G. Brida, M. Genovese, and I. R. Berchera published in *Nat. Photon*, 4(4):227-230, 2010. Only some particular light sources, namely amplitude-squeezed light, can overcome this fundamental noise, such as reported by Daniel F. Walls in the article "Squeezed States of Light" published in *Nature*, 306:141-146, 1983. Beside these very specific sources, the number of photons emitted by a light source per unit of time T is governed by a Poisson distribution with standard deviation $$\sigma = \sqrt{\overline{n}},$$

where $\overline{n}$ is the mean number of photons emitted in time interval T. Therefore, this quantum effect may be exploited to realize a QRNG by using a detector capable of resolving this distribution, such as to generate random numbers originating from a fundamentally random physical process. Such as schematically illustrated in FIG. 1, the basic assumptions of this approach consist in that (a) a number n of photoelectrons can be measured by a detector, e.g., an image sensor's pixel, with a probability P(n), (b) this measured distribution will be, assuming that the detector is operating in a linear regime, the combination of quantum uncertainty $\sigma_q$ and technical noise $\sigma_t$, and (c) from a single shot measurement these two noise components cannot be distinguished, however the technical noise $\sigma_t$ is assumed to be fully deterministic and thus known to an adversary. As will become clear in the following, it is preferable, but not necessary, for realization of a QRNG according to the present disclosure that the inevitable technical noise $\sigma_t$ of the detector is smaller, or comparable to, the quantum uncertainty $\sigma_q$ originating from the quantum nature of the light source.

A device adapted to realize the above concept comprises, such as shown schematically in FIG. 2, a light source 1, a detector 2, and a randomness extractor 3. The light source 1 may be chosen amongst a light emitting diode (LED), a laser diode (LD), or any other adequate light source, even ambient light, as long as the source emits photons randomly in the meaning defined above. The detector 2 comprises several elements and can be modeled, such as also schematically indicated in FIG. 2, as lossy channel 2.1 with a transmission probability η, similar to a beamsplitter with a given splitting ratio, followed by a photon sensor 2.2 acting as a photon-to-electron converter with unit efficiency. In this model, the transmission probability η contains all the losses due to the optical elements and the photon sensor's 2.2 quantum efficiency. The photon sensor 2.2 may be realized by any kind of photon detector, in particular by an image sensor with an array of pixels or even by each individual pixel of such an image sensor, like a nowadays commercially available CCD or CMOS camera or similar off-the-shelf components adapted to act as an image sensor and having sufficient light sensitivity. A small quantity of light from the light source 1 impinges on the photon sensor 2.2. This can be done by guiding, reflecting or scattering at the dye, package or assembly level. For each absorbed photon γ, the photon sensor 2.2 generates an electron e⁻, such as symbolically indicated in FIG. 2. The detector 2 further comprises processing electronics, in particular an amplifier 2.3 for converting the electron signal received from the photon sensor 2.2 into a voltage and amplifying the voltage signal V as well as an analog-to-digital converter (ADC) 2.4 which treats the amplified signal V received from the amplifier 2.3 by encoding the amplified signal V representing photon, respectively electron numbers into digital values and sending these values to further processing, i.e., to said randomness extractor 3 which will be described in more detail hereafter. The amplifier 2.3 and the ADC 2.4 may also be chosen amongst commercially available elements. All the above mentioned components may be integrated at a circuit, package or dye level. Advantageously, the randomness extractor can be implemented in software, but is also possible to realize that component by hardware. Furthermore, in the context of the processing electronics, it is possible to define an electron-to-digital conversion factor $\xi$. If $\xi>1$, then for each possible number of electrons generated by the photon sensor 2.2, i.e., for each possible number of photons produced by the light source 1 and absorbed by the sensor 2.2, there is one unique digital value or code at the output of the ADC 2.4, i.e., at the output of the detector 2. The condition $\xi>1$ is thus not an obligatory requirement, but preferred for optimal performance of the device. To complete the model of the detector, noise needs to be added, since noise of different origins like, e.g., thermal noise, leakage current, or readout noise cannot be avoided in a real device. In general, this noise follows a normal distribution and adds linearly to the signal, like symbolically indicated in FIG. 1.

Consequently, a device such as described above allows to access the shot noise statistics of the light source 1 and thus to generate random numbers of quantum origin. In fact, each photon absorbed by the photon sensor 2.2 will generate an electron, in particular within a corresponding pixel if an image sensor with an array of pixels is used. The number of electrons generated in time interval T is unpredictable, due to the quantum nature of light and of the absorption process. The number of electrons is converted to a voltage, amplified and digitized by components internal or external to the sensor 2.2. It is important that the amount of light and the parameters for the amplification and digitization are appropriate, so that a significant amount of quantum entropy is collected. Not all the entropy generated by this process has a quantum origin, because some is due to classical noise, such as electrical, thermal, amplification, digitization noise or structure given by the image itself. However, an appropriately tuned randomness extractor 3 allows to ensure that the output random numbers have a quantum origin, i.e., that the amount of quantum entropy per output bit is close to 1, such as will become clear in the further course of the description which will also specify in more detail the required amount of light and said parameters for the amplification and digitization.

In fact, at the output of the detector 2, a random variable $X=X_q+X_t$, where $X_q$ and $X_t$ are independent random variables taken from the quantum uncertainty distribution $D_q$ and the technical noise distribution $D_t$, respectively, is obtained. The technical noise is assumed to be completely known to an adversary, called "Eve" in FIG. 1, such that it is only possible to rely upon the quantum entropy generated. Thus, the amount of quantum entropy at the output of the detector 2 will correspond to the entropy of a Poisson distribution with a mean equal to the average number of photons absorbed $\bar{n}$, which—expressed in bits—is $$H(X_q)=\bar{n}/\ln(2)[1-\ln(\bar{n})]+e^{-\bar{n}}/\ln(2)\Sigma n^{-m}\ln(m!)/m! \quad (1).$$

For large values of $\bar{n}$ this expression can be approximated to:

$$H(X_q)=\ln(2\pi e\bar{n})/(2\ln(2)) \quad (2).$$

To collect this entropy entirely, the detector preferably should fulfill the condition $\xi>1$ mentioned above. The measured value X can be encoded over b bits, but it is of course possible to encode the value on another basis than the binary system. The entropy $H(X_q)$ of quantum origin per bit of the output will be on average $H(X_q)/b<1$. Assuming adequately chosen operating conditions such as mentioned here above, where the ADC 2.4 is not saturated, the entropy s per bit can be approximated by dividing $H(X_q)$ by the number of output bits of the ADC. To obtain a string of perfectly random bits, i.e., with unit quantum entropy per bit, an extractor is required. As detailed in the article "A Randomness Extractor for the Quantis Device" by M. Troyer and R. Renner, published in *Id Quantique Technical Report*, 2012, and the content of which is incorporated herein by reference, an extractor computes a number k of high-entropy output bits $y_i$ from a number $1>k$ of lower-entropy input bits $r_i$. This can be done by performing a vector-matrix multiplication between the vector formed by the raw bit values $r_i$ and a random 1×k matrix M (performed modulo 2) according to $$y_j=\Sigma\ M_{ji}\ r_i \quad (3).$$

Although the elements of M are randomly distributed, the matrix M serving as randomness extractor 3 usually is a pre-generated constant. For raw input bits with entropy s per bit, the probability that the output vector yi deviates from a perfectly random bit string is bounded by $$\epsilon=2^{-(sl-k)/2} \quad (4).$$

Alternatively, an adequate randomness extractor 3 may also be realized by a hash function performing an operation equivalent to the above described matrix-multiplication extractor. This is known to the person skilled in the art and thus doesn't need to be further described at this place.

In order to demonstrate the feasibility of a device such as described above, comprising a light source 1, a detector 2, and a randomness extractor 3 of the type just described, as well as the results which may be obtained with a such device, two different exemplary designs of the proposed random number generator shall now be exposed. In fact, in recent years, image sensors like the ones found in digital cameras and smartphones have improved enormously. Their readout noise nowadays is of the order of a few electrons and their quantum efficiencies can achieve 80%. Besides their ability to resolve quantum noise with high accuracy, such image sensors are 5 intrinsically parallel and offer high data rates. It is thus possible to use such image sensors as a component of a quantum random number generator, which shall in the following be demonstrated both with a commercial astronomy monochrome CCD camera, an ATIK 383L camera, and a CMOS sensor in a mobile phone, a Nokia N9 camera. The latter is a color camera from which only the green pixels were used for the purpose of the following demonstration.

FIG. 3 schematically illustrates an example of a device for random number generation according to an exemplary aspect of the present disclosure, the device comprising a light source 1 which is realized by a LED, a camera 2 which is fully and homogeneously illuminated by said LED and the raw data of which, i.e., the binary representation of pixel values produced by the camera 2, are concatenated and passed through a randomness extractor 3 which in turn outputs quantum random numbers (QRNs) ready to be used. The camera 2 is supposed to be formed either by said ATIK 383L camera or said Nokia N9 camera.

At first place, it shall be checked that the above mentioned cameras comply with the manufacturer's specification and that the operating conditions are appropriate for the generation of quantum random numbers. With respect to the latter point, it is important that the photon number distribution does not exceed the region where the camera, respectively the photon detector realized therewith, is linear and that there are enough digital codes to represent each possible number of absorbed photons, i.e., that the condition $\bar{\xi}>1$ already mentioned above is fulfilled.

To characterize the two cameras mentioned above, a well-controlled light source like a LED, such as schematically shown in FIG. 3, is used. According to the principles shown in FIG. 2, a number of photons n is absorbed by the photon sensor 2.2 of each camera 2 and converted into an equal number of electrons. This charge is in turn converted into a voltage by the amplifier 2.3 and finally digitized by the ADC 2.4. For ease of description, these components are supposed to form part of the camera 2 in FIG. 3. The amplifier gain, which in commercially available cameras corresponds to the "ISO" setting, is chosen such that each additional input electron will result in an output voltage increase sufficient to be resolved by the ADC, which means that each electron increases the digital output code c by at least 1. This can be checked by illuminating the cameras with a known amount of light. By doing so and using the nominal quantum efficiency of the cameras to infer $\bar{n}$, one observes $\bar{\xi}=c/e$ to be 2.3 codes/electron for the ATIK camera, and 1.9 codes/electron for the Nokia camera, as expected from the devices' specifications.

Figure 4A:
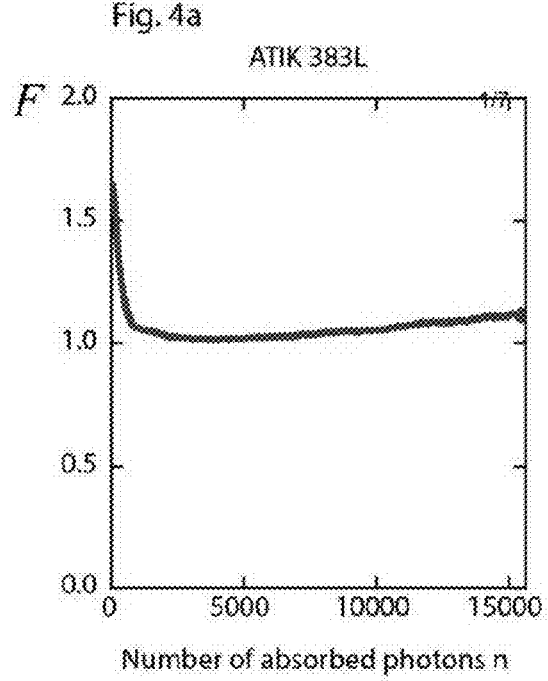
FIGS. 4a and 4b show, for an ATIK 383L camera, respectively for the camera included in the Nokia N9 mobile telephone, the Fano factor F for various illuminating intensities.
Figure 4B:
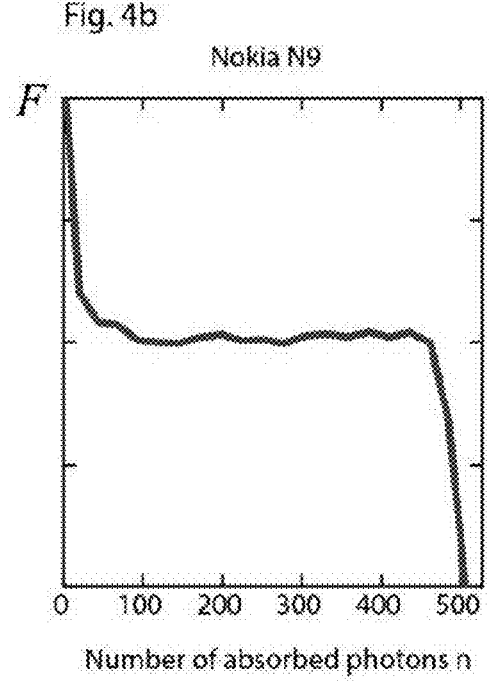

The value of $\bar{\xi}$ can then be used to infer the number n of absorbed photons from the digital reading. This allows to evaluate the Fano factor F, defined as $F=\sigma^2(n)/\bar{n}$, which is expected to be 1 for a Poisson distribution. Conversely, the fact that for a linear detector the Fano factor $F=1$ can be used to measure $Q_e$ and $\bar{\xi}$. FIGS. 4a and 4b show, for the ATIK camera, respectively for the Nokia camera, the Fano factor F obtained in this way for various illuminating intensities of these detectors. Accordingly, both detectors have a large range of intensities where the Fano factor is close to 1, in particular both the ATIK and the Nokia cameras have good linearity, i.e., better than 0.998 for a large range of light intensities. In this range, the statistics are dominated by the quantum uncertainty, i.e., by the shot noise. At strong illuminations, saturation occurs, which means that the Fano factor decreases, as the output is a constant. For the Nokia N9 camera, this happens at intensities corresponding to about 450 to 500 absorbed photons per pixel, whilst for the ATIK camera this happens at about $2\times10^4$ absorbed photons per pixel. This is due to the high amplifier gain used, which was chosen at ISO 3200. At low illumination intensities, a Fano factor much greater than 1 is observed, which is due to the detector's technical noise.

Image sensors such as CCD and CMOS have various sources of noise, like thermal noise, leakage current and readout noise. Thermal and leakage noise accumulate with integration time, such that it is possible to eliminate or at least greatly reduce these noise sources by using short exposure times, e.g., exposure times of the order of a millisecond, e.g., in the range of 0.1 to 100 milliseconds. In this case, readout noise becomes the dominant source of technical noise and is given by the readout circuit, the amplifier and the ADC. In image sensors, noise is usually counted in electrons (e). The ATIK 383L CCD camera and the Nokia N9 CMOS camera have a noise of 10 e$^-$, and 3.3 e$^-$, respectively. However, it is not possible to generalize the values of the exposure times indicated above for all types of cameras, since this also depends on the impinging light intensity. In fact, the exposure time has to be chosen depending on the type of camera, i.e., the type of detector 2, and the light intensity such that the detector works in its linear regime and that, preferably, the readout noise becomes the dominant source of technical noise. In practice, the exposure times thus may vary greatly.

In view of the working principles of a QRNG according to the present disclosure mentioned above, in order to allow using these cameras to generate random numbers of quantum origin, the cameras need to be illuminated such that the mean number of absorbed photons $\bar{n}$ is sufficient to give a quantum uncertainty $$\sigma = \sqrt{\bar{n}}$$

as large as possible whilst not saturating the detectors. Therefore, in practice, the ATIK and Nokia cameras used here to demonstrate feasibility of a device for quantum random number generation according to the present exemplary aspects are illuminated during a time interval T sufficient to generate $1.5\times10^4$ e$^-$ and 410 e$^-$ respectively. The specifications and operating parameters mentioned here above are summarized in Table 1. Normalized histograms of the obtained photon distributions are shown in FIGS. 5a and 5b for the ATIK 383L CCD camera and for the Nokia N9 CMOS camera, respectively.

TABLE 1

Specifications of and Operating Parameters Employed for the Two Cameras

|  | ATIK 383L | Nokia N9 |
|---|---|---|
| Noise $\sigma_t$ (e$^-$) | 10 | 3.3 |
| Saturation (e$^-$) | $2\times10^4$ | 450-500 |
| Illumination (e$^-$) | $1.5\times10^4$ | 410 |
| Quantum uncertainty $\sigma_q$ (e$^-$) | 122 | 20 |
| Offset (e$^-$) | 144 | −6 |
| Output bits per pixel | 16 | 10 |
| Quantum entropy per pixel | 8.9 bits | 6.4 bits |
| Quantum entropy per raw bit | 0.56 | 0.64 |

At second place, it is then possible on the basis of these facts and operating parameters to use equation (2) to calculate the amount of entropy of quantum origin per pixel, which is 8.9 bits and 6.4 bits for the ATIK 383L CCD camera and for the Nokia N9 CMOS camera, respectively. These are encoded over 16 and 10 bits, respectively, resulting in an average entropy per output bit of 0.56 for the ATIK 383L CCD camera and 0.64 for the Nokia N9 CMOS camera. These results are also figuring in Table 1. Finally, an adequate extractor 3 is applied according to equation (3) which allows to apply a mixing of the randomness of quantum origin contained in each raw bit obtained from the detector 2 into the output bits of the randomness extractor 3 forming the final digital output of the QRNG as well as to increase the entropy in the output bits of the randomness extractor 3 as compared to the one in the raw bits obtained from the detector 2. This is an important reason why it is preferable, but not necessary for realization of a QRNG according to the present disclosure that the inevitable technical noise $\sigma_t$ of the detector 2 is smaller, or comparable to, the quantum uncertainty $\sigma_q$. The choice of the extractor 3, in particular with respect to its dimension k, is done according to the above mentioned principles. In fact, as mentioned above, the detected photon number distribution can be described by a Poisson distribution and its minimum entropy can be approximated by equation (1). Thus, the size and the compression factor of the extractor 3 may be tuned such as to ensure that each bit of output from the extractor has an amount of quantum entropy close to 1 by determining the size and the compression factor of the randomness extractor so that the number of output bits per measurement is smaller than the minimal entropy of the detected photon number distribution. In the particular case of the matrix-multiplication extractor introduced above, this can be done using equation (4) and ensuring that the extractor's parameters l and k, for a mean entropy s per bit, are chosen such as to ensure that the probability $\epsilon$ that the extractor's output bit string deviates from a perfectly random one is small. In particular, equation (4) above allows to calculate that by using the camera in the Nokia cell phone and an extractor with a compression factor of 4, for example, with k=500 and l=2000, it would take ~$10^{118}$ trials to notice a deviation from a perfectly random bit string. Thus, if everybody on earth used such a device constantly at 1 Gbps, it would take ~$10^{80}$ times the age of the universe for one to notice a deviation from a perfectly random bit string.

In order to test the quality of random numbers generated in such manner, 48 frames corresponding to approximately 5 Gbits of raw random numbers generated using the above described framework were collected and processed on a computer through an extractor with a 2000 bit input vector and a 500 bit output vector, which allowed to generate 1.25 Gbits of random numbers. Although random number generators are notoriously hard to test, it is possible to check the generated bit string for specific weaknesses. A first testing step may be to individuate potential problems of the system and then test for them. In the present case, the generated random bit string was tested before extraction. At this stage, the entropy per bit is still considerably less than unity; moreover, possible errors could arise from damaged or dead pixels of the detector 2 and from correlations between pixel values due to electrical noise. In fact, besides increasing the mean entropy per bit, the randomness extractor 3 also ensures that if some pixels become damaged, covered by dust, or suffer from any other problem, an extremely good quality of the randomness is maintained. A second testing step may consist in the "die harder" randomness tests which can be applied on both the extracted bit strings, i.e., the raw random numbers produced at the output of the detector 2 and the random numbers delivered by the randomness extractor 3. This set of tests contains the NIST test, the diehard tests and some extra tests. The QRNG according to the present disclosure passed all these tests.

Next to the quality of the random numbers generated, other parameters of a QRNG are important, e.g., the production speed of the random numbers, as well as affordability and portability of the device. In fact, for many applications, such as the generation of cryptographic keys for conventional use or gaming, speed is not as important as the affordability and portability which are provided by this system. Nevertheless, a quantum random number generator based on an image sensor can provide very reasonable performance in terms of speed. Consumer grade devices such as the CCD and CMOS detectors used acquire data at rates between 100 Megapixels per second and 1 Gigapixel per second. After the necessary processing, each pixel will typically provide 3 random bits so that rates between 300 Mbps and 3 Gbps can be obtained. To sustain such high data rates, processing can be done either on a Field Programmable Gate Array (FPGA) or could be embedded directly on a CMOS sensor chip, including the processing step realized by the randomness extractor 3 which in that case is featured by hardware. Alternatively, implementing the randomness extractor 3 fully in the software of a consumer device is possible and can sustain random bit rates greater than 1 Mbps, largely sufficient for most consumer applications. Therefore, it is possible to realize a device for quantum random number generation according to the present disclosure by using technology compatible with consumer and portable electronics.

Thus, random numbers of a quantum origin can be extracted by illuminating a known image sensor and applying specific operating parameters to the photon sensor 2.2, the processing electronics, as well as the randomness extractor 3. In fact, according to the above figuring explanations with respect to a device for random number generation based on an optical process of quantum nature, a corresponding method for random number generation comprises the steps of providing a light source 1 emitting photons randomly, providing a light detector 2 adapted to absorb the randomly emitted photons and to measure the number n of photons produced by said light source 1 in a time interval T and comprising a photon sensor 2.2, an amplifier 2.3, and an analog-to-digital converter 2.4, and providing a randomness extractor 3, such as to allow detecting the number n of photons produced by said light source 1 in a time interval T and converting said number of photons into a corresponding number of electrons with the help of said photon sensor 2.2 of detector 2, converting the electron signal received from the photon sensor 2.2 into a voltage and amplifying the voltage signal V with the help of said amplifier 2.3 of detector 2, and treating the amplified signal V received from the amplifier 2.3 by encoding the amplified signal V into digital values with the help of said analog-to-digital converter 2.4 of detector 2 and sending these values to the randomness extractor 3 for further processing such as to produce quantum random numbers (QRNs) based on said number n of photons produced by the light source 1 in a time interval T.

The photon sensor 2.2 of detector 2 is illuminated by the light source 1 during a time interval T which is chosen such that the mean number of absorbed photons $\bar{n}$ is sufficient to give a quantum uncertainty $$\sigma = \sqrt{\bar{n}}$$

as large as possible whilst not saturating the photon sensor 2.2. In particular, the photon sensor 2.2 of detector 2 is illuminated by the light source 1 with a photon intensity situated within a range of intensities where the Fano factor of the photon sensor 2.2 is close to 1. It is also possible to control the mean number of absorbed photons by adjusting the exposure time of the camera, within the limit that the exposure time needs to be chosen such that the camera works in its linear regime.

Advantageously, the raw digital values $r_i$ generated at the output of detector 2, respectively the digital values $y_i$ at the output of the randomness extractor 3 are encoded over b bits, or are encoded on another basis than the binary system.

In light of the above description of the device and of the corresponding method according to the present disclosure, its advantages are clear. Most importantly, a device for quantum random number generation according to the exemplary device and method allows generation of high quality random numbers of quantum origin since being based on a fundamentally random physical process. The random numbers may be generated at a high rate. The device can be implemented with commercially-available imaging devices such as CMOS and CCD cameras which are small and low cost. Also, it can be easily integrated on a printed circuit board. In fact, all elements such as light source, light detector, and randomness extractor, as well as other, optional components like for self-testing and further data processing such as encryption and transmission can be integrated at the system, circuit, package or dye level, which improves size, ease of use, security, reliability and energy efficiency of the whole device. Furthermore, many mobile and computing devices nowadays include an image sensor of a type adapted to be used, either by minor modification or in some cases directly, as a detector such as required in a device according to the present disclosure to generate quantum random numbers. Such image sensors have low-power consumption compatible with mobile and battery powered applications. The randomness extractor can be implemented in hardware or, by software. Due to its small size, the device can be integrated with other components such as a camera, encryption, transmission, diagnostic device etc.; in particular, given that many consumer electronics articles are anyway equipped with an image sensor adapted to be used for the purposes of the present disclosure, the latter may advantageously be integrated with such components and corresponding software into a computer, a telephone, in particular mobile computers or telephones, tablets, network cryptographic devices, personal cryptographic devices, electronic wallets, or any other type of similar instruments. Thus, in general, the simplicity and performance of a device and method disclosed herein allow, in contrast to existing QRNG, to make widespread use of physical quantum random number generators, with an important impact on information security.

According to the exemplary aspect described above with respect to FIGS. 2 and 3, the exemplary device for random number generation is provided with a single randomness extractor 3. In particular, a light source 1 illuminates a matrix or array of pixels of the photon sensor 2.2 and the statistical distribution of the number of photons emitted by the light source 1 during a given time interval T is utilized as the source of randomness. According to the exemplary aspect, each pixel can produce an integer that is statistically distributed according to the Poisson distribution, as discussed above. Furthermore, the randomness extractor 3 is provided to not only remove defects, but also to make the distribution of the integers uniform and unbiased. Thus, as would be understood to one skilled in the art, the actual entropy that is produced by a particular pixel of the array of photon sensor 2.2 can depend on local parameters, including the level of illumination, the sensitivity of the pixel, and the like.

Figure 6:
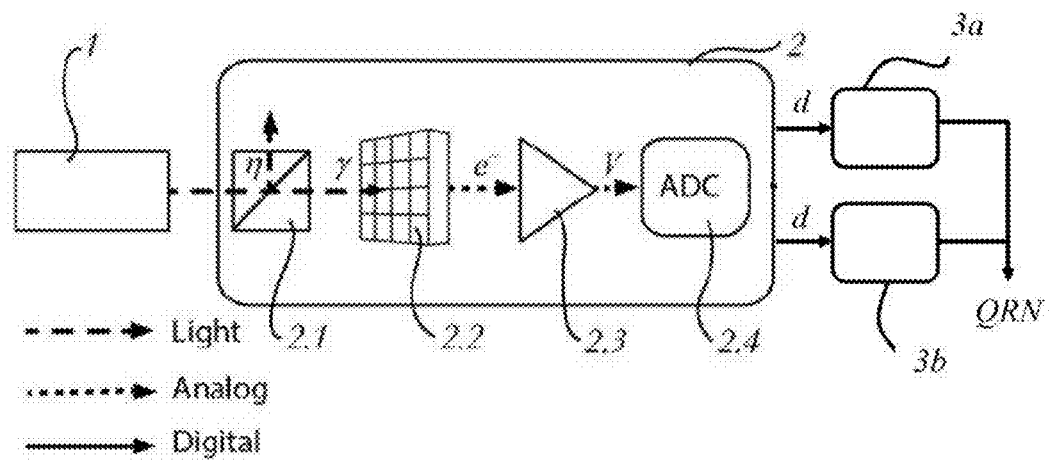
FIG. 6 schematically illustrates a block diagram of device for random number generation according to another aspect of the present disclosure.

FIG. 6 schematically illustrates a block diagram of device for random number generation according to another aspect of the present disclosure. According to this disclosure, a random number generation device is disclosed that provides high entropy per bit by adapting one of a plurality of randomness extractors based on the quality and conditions of each pixel. As will be described in detail below, for photon sensors, often one or more or a group of pixels will yield sub-optimal entropy, for example, due to insufficient illumination, pixel saturation, or other pixel defects and nonlinearities. According to the exemplary embodiment, the amount of genuine quantum entropy generated by each pixel or group of pixels is evaluated and the measured value from such pixels is sent to the appropriate extractor, that will yield sufficiently high-entropy output bits.

As shown in FIG. 6, the random number generation device shown includes many of the same components of the exemplary aspect described above with respect to FIG. 2. Namely, the device includes a light source 1 and a detector 2, which further includes a lossy channel 2.1, a photon sensor 2.2, an amplifier 2.3 and a ADC 2.4. The details of these components are described above and are the same and, therefore, will not be further described. However, as further shown in FIG. 6, the random number generation device includes a plurality of randomness extractors. As shown, the device includes a pair of randomness extractors 3a and 3b, but it should be appreciated that the exemplary device can include three or more randomness generators in accordance with the spirit of the disclosure described herein. As discussed in detail below, the random number generation device according to FIG. 6 optimizes the random bit output after randomness extraction by adapting one or more randomness extractors 3a and 3b to each element of the photon sensor 2.2.

In particular, in a design where one randomness extractor is utilized for all pixels of the photon sensor 2.2 (for example, as described above with respect to FIG. 2), the size and compression factor of the randomness extractor must be tuned according to the element or pixel with the lowest entropy. As a result, for all other pixels, the randomness extractor will be suboptimal, leading to a degraded random output throughput. As should be understood to one skilled in the art, this limitation is not well suited to dealing with entropy degradation due to aging of the photon sensor 2.2 or the like. Indeed, it is possible that, due to aging effects (e.g., degradation of the light source 1 or the like), the entropy of the pixel elements can fall below the minimum threshold of the randomness extractor, leading to imperfect randomness generation.

According to the exemplary configuration shown in FIG. 6, the random number generation device goes through a periodic calibration in which the entropy of each pixel is measured and then the plurality of randomness extractors 3a and 3b are matched to the pixels. In one aspect, the randomness extractors are matched to the pixels (or regions of pixels) such that the measured entropy is higher than the minimum entropy threshold of the selected randomness extractor and that the selected randomness extractor is the most efficient extractor meeting the previous measured condition. As described above, the randomness extractors can be implemented using vector-matrix multiplication, hash functions or the like and can be implemented using software and/or a combination of software and hardware. Thus, the matching can be implemented by identifying the entropy level of the pixel (or region of pixels), determining which randomness extractors of the plurality have a minimum entropy threshold that is below the measured entropy level, and then adjusting the software and are hardware such that the digital values corresponding to the electron signals output by the respective pixel are input to the matched/associated randomness extraction during normal operation of the device (i.e., when the device is operating to generate random numbers).

According to one aspect, the plurality of randomness extractors can concentrate the randomness that exists in many weakly-random bits into a few bits each with high level of randomness, for example, a minimum entropy of approximately 1. According to specific refinements of the exemplary aspect, the randomness extractor can be configured on a by bit operation. That is, if it is determined known that a bit-string (e.g., 10 bits long) has a minimum entropy $H_{min} > 1$, then the randomness extractor can apply an operation that depends on all the bits, such as taking the XOR of the 10 bits, resulting in a single bit output that has an entropy very close to 1. According to another refinement, the randomness extractors can be based on vector-matrix multiplication. In this refinement, an input bit vector with low entropy-per-bit of length X is multiplied by a (fixed) random bit matrix of size X, Y, which results in a shorter output bit vector of size Y with high entropy-per-bit. It should be appreciated that the choice of matrix size is an appropriate compromise between the efficiency of the extractor, i.e., how much of the entropy is extracted, and the requirement for computational resources. In other words, a larger matrix will extract randomness more efficiently, but require more gates to be implemented or longer software runtimes or requires larger buffers to acquire bits. Finally, in another refinement, the randomness extractors can be selected as hash functions that concentrate the entropy from an arbitrary-length input string into a fixed-length output that has higher entropy per bit.

According to the exemplary aspect as described above, each of the plurality of randomness extractors 3a and 3b can have a different minimum entropy threshold according to the exemplary aspect. Initially, each pixel will be associated with a particular extractor of the plurality of randomness extractors 3a and 3b. According to one aspect, the pixels may be grouped by extractor. Preferably, the random number generation device will operate for a period of time before a calibration of the device is performed. The calibration includes measuring the entropy of each pixel (or a portion thereof) of the photon sensor 2.2 and then determining the optimal randomness extractor of the plurality of randomness extractors 3a and 3b to be used for each pixel (or grouping of pixels). The process for selecting the optimal randomness extractor for a pixel or grouping of pixels will be described in more detail below with respect to FIG. 10.

Figure 7A:
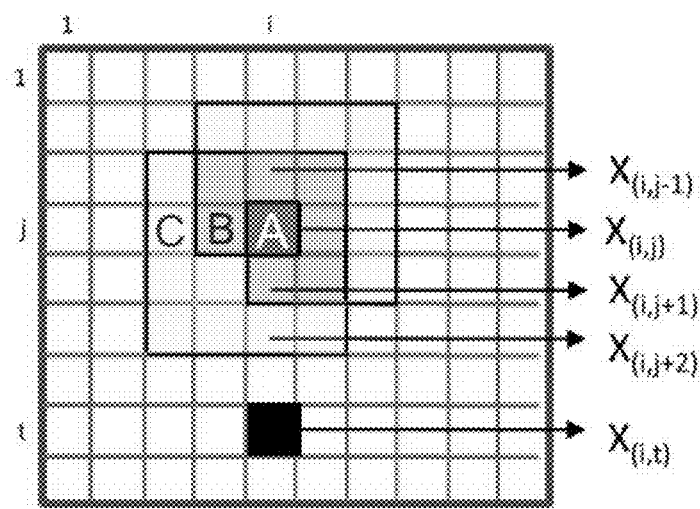
FIG. 7A illustrates an example of a photon sensor according to the exemplary aspect to illustrate a method for calibrating the random number generation device described herein.

FIG. 7A illustrates an example of a photon sensor according to the exemplary aspect to illustrate a method for calibrating the random number generation device described herein. As shown, the photon sensor, which should be understood to be photon sensor 2.2, for example, is composed of X number of pixels. Furthermore, each pixel can be classified from $X_{(1,1)}$ to $X_{(M,N)}$ based on the particular pixel's column number and row number. As described above, based on a typical light source used (e.g., an LED light source), the number of photons emitted per unit of time is governed by a Poisson distribution. As a result, the number of detectable photons shows a statistical variation depending on the pixel location which is described as a Poisson distribution. In practice, illumination may not be uniform, for example because of the geometric arrangement of the device, which can lead to additional statistical variations depending on pixel location. Moreover, the detected signal can also depend on pixel intrinsic characteristic and defaults (as it may be a dead or hot pixel). Therefore, the level of detected signal will very across the pixel array, which implies that the level of extractable entropy will also vary across the pixel array.

As shown in FIG. 7A, three regions are represented to illustrate the effect of the Poisson distribution and pixel intrinsic characteristics. A first region "A" (which corresponds to pixel location $X_{(i,j)}$) is a light sensor region having high intensity illumination and high photon density detection. Next, a second region "B" is a light sensor region with a medium intensity illumination and medium photon density detection. Further, a third region "C" is a light sensor region with low intensity illumination and low photon density detection. Furthermore, for exemplary purposes, a dead pixel is illustrated in $X_{(i,t)}$.

FIG. 7B further illustrates a distribution of probability P(n) that a number n of photons is measured during a timeslot by the pixels in the corresponding regions "A", "B", and "C". As noted above, it should be appreciated that the probability P(n) can be based on the combination of quantum uncertainty $\sigma_q$ originating from the quantum nature of a light source and technical noise $\sigma_t$ originating from the technical equipment used. As shown in FIG. 7B, the mean of the distribution and the probability P(n) that the number n of photons will be measured is highest at the pixel location $X_{(i,j)}$, and is slightly lower at the adjacent pixels (e.g., $X_{(i,j-1)}$ or $X_{(i,j+1)}$) to the focal pixel, and lowest at pixels spaced farther from the focal pixel (e.g., $X_{(i,j)}$), for example at pixel $X_{(i,j+2)}$. As described above, the measured values output at each pixel are encoded over b bits according to an exemplary aspect, although it is of course possible to encode values on another basis than the binary system.

As further described above, the amount of quantum entropy corresponds to the entropy of a Poisson distribution with a mean equal to the average number $\bar{n}$ of photons absorbed, where n is the number of absorbed protons. According to the example described herein, the minimum entropy variation is calculated according to the following formula:

$$H_{min}(X_q) = -\log_2\left[\frac{e^{-\bar{n}}\bar{n}^n}{n!}\right]$$

Figure 8:
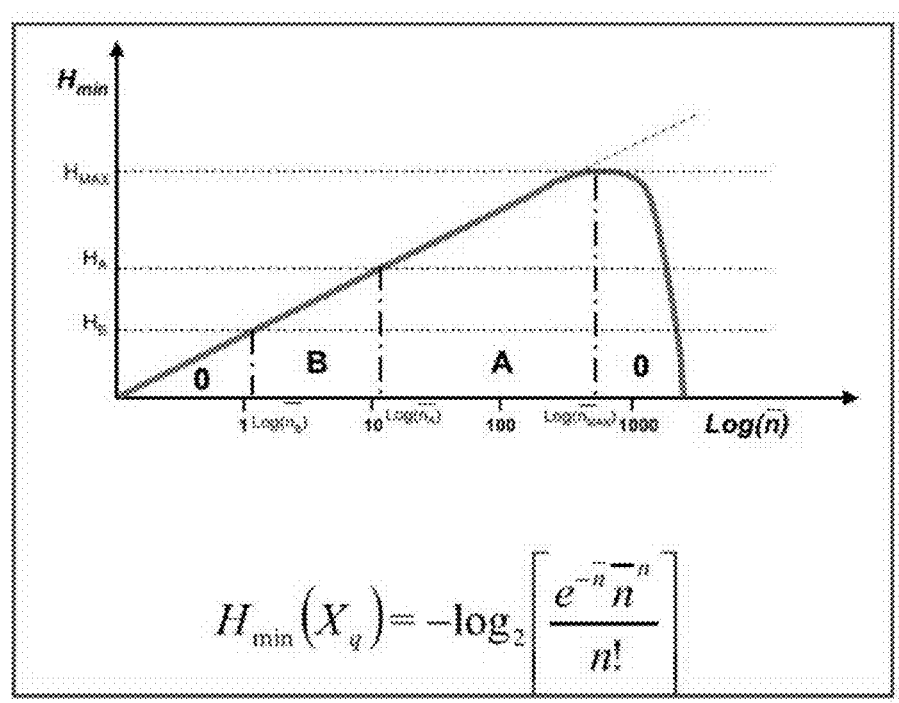
FIG. 8 illustrates a graph depicting a representation illustrating a minimum entropy variation that is plotted as a function of the absorbed photons n according to an aspect of the present disclosure.

In particular, FIG. 8 illustrates a graph depicting a representation illustrating a minimum entropy variation that is plotted as a function of the absorbed photons n. As shown, the graph illustrated in FIG. 8 provides several regions that can be defined depending on the illumination in the regions, as defined by a number of photons detected in the region. In particular, FIG. 8 illustrates regions "A" and "B" that correspond to the regions of the pixel array described above with respect to FIG. 7A.

In the example of FIG. 8, region "B" is the area defined as $1 \prec \log(\bar{n}) \prec 10$ and region "A" is the area where $10 \prec \log(\bar{n}) \prec 1000$. As noted above, $\bar{n}$ is equal to the mean of the number of photons absorbed over a given time interval T. It should be appreciated that Area "A" is the most illuminated pixel or region, whereas Area "B" is less illuminated. Furthermore, the minimum entropy levels or thresholds $H_A$ and $H_B$ are defined accordingly. Further, $H_{MAX}$ corresponds to the highest level of entropy the pixel can obtain before saturation, which leads to a "null" extractor, as will be discussed in detail below. For example, Area "C" could have insufficient or be saturated, and, therefore, need to be associated with the null extractor.

In general, the entropy s of quantum origin per bit of output is defined on average as $H_{min}/b$, where b is the number of bits over which the measured values output at each pixel are encoded. Thus, the entropy $S_A$ for raw input bits per bit for region "A" is $H_A/b$ and likewise the entropy $S_B$ for region "B" is $H_B/b$. As further described above, the randomness extractor is required to obtain a string of perfectly random bits (i.e., with a unit quantum entropy per bit). The randomness extractor is configured to calculate a number k of high entropy output bits $y_j$ from a number $1 \prec k$ of lower entropy bits $r_i$. This operation may be done by performing a vector-matrix multiplication between the vector formed by the raw bit values $r_i$ and a random l×k matrix M, according to formula (3).

Thus, according to the exemplary aspect and the calculation shown in FIG. 8, for each area detection "A" and "B", a minimum entropy $H_A$ and $H_B$ can be calculated and a dedicated randomness extractor can be associated based on the respective minimum entropy values as described above. According to an exemplary aspect, matrix $M_A$ is a l×$k_A$ matrix and matrix $M_B$ is $l \times k_B$ matrix with $k_A \prec k_B$. It should further be appreciated that according to an exemplary aspect, when the light sensor saturates the photon sensor 2.2 and the specific pixels array of pixels, the entropy variation drops quickly to 0. In this case, the device will define the randomness extractor a 0 matrix since $H_{min}$ will be set to be null.

By calculating the minimum entropy $H_{min}$ for each pixel or each region (e.g., array of pixels), the random number generation device is configured to be periodically calibrated. In particular, the normal operation (i.e., generation of random numbers, as described above) can be temporarily interrupted to run the calibration phase. Based on the measured entropy for each pixel or each region (e.g., array of pixels), the device can associate each such element with a particular randomness extractor of the plurality of randomness extractors 3a and/or 3b. According to one exemplary aspect, this association is performed by determining that the measured entropy is higher than the minimum entropy threshold of the selected extractor. In addition, the device can ensure that the selected randomness extractor is the most efficient of all the extractors that satisfies this condition. Accordingly, once this association is made, random number generation device can return to normal operation (i.e., generation of random numbers) where the associated randomness extractor for a given pixel or region of pixels will receive the respective digital values from the specific pixel or region of pixels to produce quantum random numbers based on the number n of photons produced by the light source in a time interval T, as described above.

According to one exemplary aspect, the calibration process can be repeated periodically. As a result, the random number generation device is configured to adjust the number generation process to avoid or minimize aging effects of the photon sensor 2.2 that lead to entropy degradation.

Figure 9:
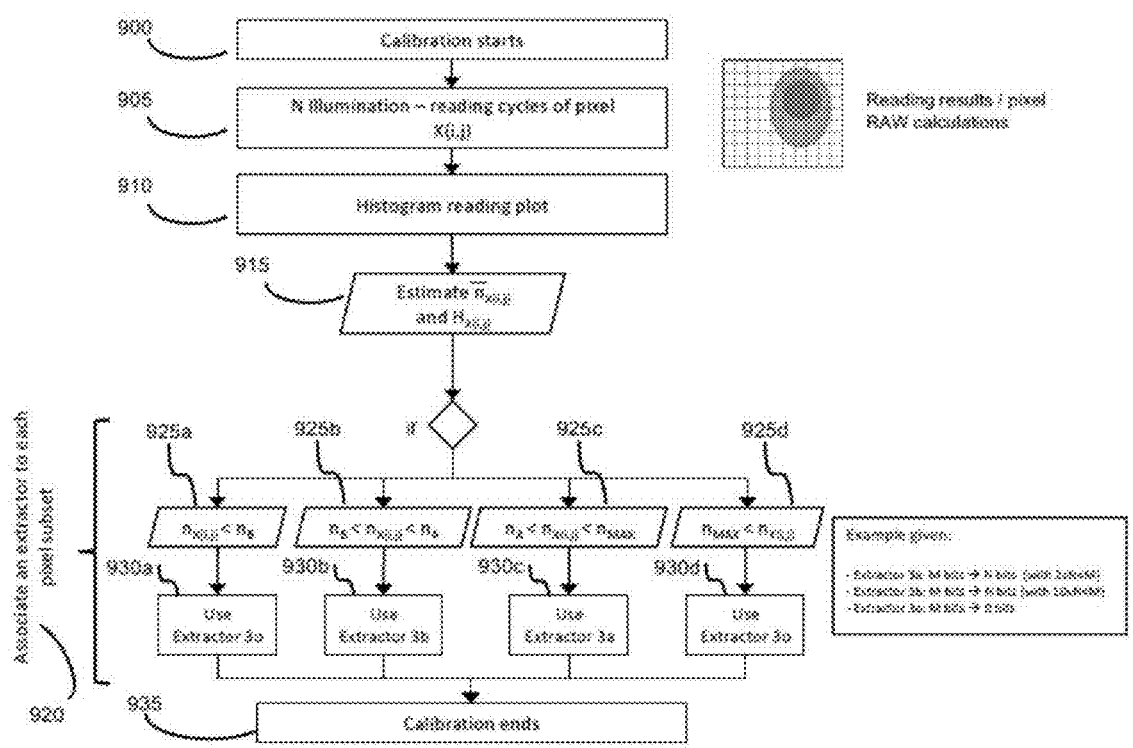
FIG. 9 illustrates a flowchart for a method of calibration of the random number generation device at a pixel level according to an aspect of the present disclosure.

FIG. 9 illustrates a flowchart for a method of calibration of the random number generation device at pixel level according to an aspect of the present disclosure. In particular, FIG. 9 illustrates a method for selecting a particular randomness extractor according to the response of a specific pixel subjected to illumination. In a first step 900, the calibration starts and N reading cycles of each pixel $X_{(i,j)}$ are performed through pixel illumination as described above (shown as step 905 in FIG. 9). The illumination can be continuous, i.e. the light source is on during the whole N reading cycles, or pulsed, i.e. the light source is tunred on and off at each cycle of the N cycles. For each pixel $X_{(i,j)}$, the output of the N reading cycles are used to plot histograms of photons detected (Step 910). Next, at step 915, the amount of photons absorbed n and associated entropy minimum entropy $H_{min}$ is estimated for each pixel. One possible approach to estimate the minimum entropy is to calculate the mean photon number associated with the statistical distribution represented by the histogram. The device can for example calculate and store for each pixel $X_{(i,j)}$ an estimate of the average the absorbed photons per reading cycle $n_{X(i,j)}$ and a pixel-specific minimum entropy $H_{X(i,j)}$.

As noted above, the exemplary aspect of the device includes a plurality of randomness extractors 3a and 3b. In this example of FIG. 9, it is assumed that a third randomness extractor 3o is provided. In this instance, the randomness extractor, which includes a set of extractors (3a, 3b, and 3o) can be chosen depending on the number of photons detected by a pixel over a reading cycle. According to the exemplary aspect, extractor 3a is designed to transform M bits in N bits (with 2×N<M), where extractor 3a is dedicated to areas with higher illumination. Moreover, extractor 3b has the capacity to transform M bits in N bits (with 10×N<M), where extractor 3b is dedicated to low light illumination areas. Finally, extractor 3o transforms M bits in 0 bits, which is dedicated to areas with saturation or very low light illumination (e.g., the null extractor described above).

Referring again to FIG. 9, at step 920, an extractor from a family of predefined set of extractors (the set of extractor 3a, 3b and 3o) is associated to each illumination area (e.g., respectively, A, B and C of FIG. 7a) and by consequence to a pixel or a sub-matrix of pixels (a sub matrix does not need to be formed of adjacent pixels). Said step 920 relies on two sub-steps 925 and 930 where the software of the disclosed device is executed to determine which randomness extractor should be used for which pixel. According to the exemplary method, at step 925a, if $n_{X(i,j)} < n_B$, then the device will associate extractor 3o with the pixel X (step 930a). Moreover, at step 925b, if $n_B < n_{X(i,j)} < n_A$, then the device will associate extractor 3b with the pixel X (step 930b). Further, at step 925c, if $n_A < n_{X(i,j)} < n_{MAX}$, then the device will associated extractor 3a with the pixel X (step 930c). Finally, at step 925d, if $n_{MAX} < n_{X(i,j)}$, then the device will associate extractor 3o with the pixel X (step 930d). It should be appreciated that $n_A$, $n_B$, and $n_{MAX}$ can be predetermined thresholds for associating the randomness extractors. In particular, it should be appreciated that for any number of photons absorbed below $n_B$, the device assumes that the pixel is absorbing at a very low light and thus assigns the null extractor, as described above. Similarly, when the number of photons absorbed is above $n_{MAX}$, the device recognizes that pixel has reached saturation and again assigns the null extractor, as described above. The result of the process described in FIG. 9 is an "entropy to extractor map". This map associates each pixel to a particular extractor of the family of extractors (as an example 3a, 3b, 3o). This calibration process described in FIG. 9 may be done as a boot step before quantum random number generation operation, when the disclosed device is turned on. It can also be repeated from time-to-time during normal operation of the device (i.e., generation of random numbers). In this case, the activation of this calibration process can be triggered by events such as time interval since last calibration, change in environmental conditions or even external user request.

Alternatively, FIG. 10 illustrates the method for calibration of the random number generation device based on live update, which means that calibration is done while random bits acquisition is done in parallel. As shown, in a first Step 1005, the operation cycles starts in order to generate random numbers. This is done while light source 1 illuminates the photon sensor 2.2 including a matrix of pixels and absorbed photons are measured to characterize the output of the light sensor matrix in a second step 1010. As mentioned above, the illumination can be continuous or pulsed. This illumination-reading step 1010 enables simultaneously to acquire random bits and update the "entropy to extractor map" based on said acquired bits. In order to do so, two processes are done in parallel, namely: random bits storage (step 1020) and entropy to extractor map update (step 1040) based on $H_{min}$ calculation. At Step 1020, the values read at Step 1010 on each pixel of the light sensor matrix are stored in a buffer. The buffer used for each pixel is determined according to the "entropy to extractor map". A buffer can be associated to a single pixel. In this case, the values read from this specific pixel are appended at each step 1020 to the buffer. A buffer can also be associated to a sub-matrix consisting of more than one pixel. Note that the sub-matrix does not need to consist of adjacent pixels. In this case, the values read from all the pixels of the sub-matrix are appended at each 1020 to the buffer. The buffers of Step 1020 are emptied from time-to-time (not shown on FIG. 10). This is achieved by sending at least some of the values stored in the buffer to the randomness extractor associated with this buffer and erasing these values from this buffer. On the other hand, at step 1030, at each reading cycle, a minimum entropy $H_{min}$ is calculated. This calculation takes into account the minimum entropy value calculated at the previous step, as well as the current illumination-reading cycle. One possibility to calculate this minimum entropy is to update a moving average of the mean number of photons absorbed in a cycle and to use this value to calculate the minimum entropy. As should be appreciated to one skilled in the art, since the calibration process is done in parallel to quantum random number generation proper operation, the moving average can be updated after each reading while the random number generation device is operating to ensure that a defective element will not impact random numbers output. Finally, at Step 1040, the entropy to extractor map is updated, which implies that one of the randomness extractor of the plurality of randomness extractors 3a and 3b is defined for each pixel (or region of pixels) based on the minimum entropy $H_{min}$ calculated at Step 1030. At that point, the calibration process is done in parallel to random number generation device normal operation and the calibration process ends when the operation cycle ends (Step 1050).

Referring back to FIG. 6, according to one refinement of the exemplary aspect, a null or "dummy" randomness extractor can be implemented for the random number generation device. As with any camera or other photon sensor, pixels can be faulty or degrade over time where they do not exhibit an entropy level that is sufficient for practical purposes of generating a random number according to the device and method described above. These elements can be referred to as "hot" elements or pixels of the photon sensor.

According to this aspect, the null randomness extractor can be applied or associated with these pixels or regions of pixels. In this instance the digital values generated by any "hot" elements will be output to the null randomness extractor, which, in turn, does not output any random bits for the random number generation. According to the configuration shown in FIG. 6, randomness extractor 3a can be an operational extractor and randomness extractor 3b can be a null extractor. Once the random number generation device performs the calibration method as described above, all pixels or regions of pixels that fail to exhibit a sufficient minimum entropy level will be associated with the null extractor. As should be appreciated to one skilled in the art, a "sufficient" minimum entropy level can readily be viewed as a predetermined threshold stored in memory of the random number generating device and the entropy levels for each pixel can be compared against this predetermined threshold to determine whether the pixel exhibits a sufficient entropy level to be used to generated output bits for a random number.

In view of the above description of the device and corresponding method according to the present disclosure, its advantages are clear. Most importantly, a device for quantum random number generation according to the present disclosure allows generation of high quality random numbers of quantum origin since being based on a fundamentally random physical process. Furthermore, implementing the calibration method and technique disclosed herein, the device maximizes the bit rate produced by selecting the optimal randomness extractors for each element. Furthermore, the device is configured to overcome aging effects by periodically performing and repeating the calibration step and using multiple randomness extractors with each element. Finally, according to one refinement, the device overcomes the development of "hot" elements that exhibit an entropy level that is too low and insufficient for random number generation. In this regard, the calibration method enables the device to maintain optimal randomness and avoid pixels that might be dead ("white pixels") due to several effects, including aging, thermal, mechanical, illumination power, electrostatic fields and the like. Thus, one skilled in the art would understand that the calibration method enables optimal random number generation even if certain single elements of the photon sensor 2.2 may be defective.

Finally, it is to be noted that the present disclosure is also related to computer program means stored in a computer readable medium adapted to implement the above described method. For example, in various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be implemented in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any example implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for generating random numbers based on an optical process of quantum nature, the method comprising:
   emitting photons from a light source;
   absorbing, by a photon sensor having a plurality of pixels, the photons emitted from the light source;
   calculating respective minimum entropy levels for the plurality of pixels of the photon sensor;
   associating one of a plurality of extractors with at least one of the plurality of pixels based on the calculated minimum entropy level of the at least one pixel; and
   generating, by the extractor associated with the at least one pixel, a number of high-entropy bits for generating a random number.

2. The method for generating random numbers according to claim 1, further comprising:
   converting, by an analog-to-digital converter, an electron signal received from the photon sensor into a voltage; and
   amplifying, by an amplifier, the voltage signal and inputting the amplified voltage to the extractor associated with the at least one pixel of the photon sensor.

3. The method for generating random numbers according to claim 1, wherein the generating of the number of high-entropy bits comprises generating a number k of high-entropy output bits $y_j$ from a number $1 \prec k$ of lower entropy bits $r_i$.

4. The method for generating random numbers according to claim 1, wherein the calculating of the minimum entropy levels comprises calculating an entropy of a Poisson distribution with a mean equal to an average number of photons absorbed by regions of the plurality of pixels of the photon sensor.

5. The method for generating random numbers according to claim 4, further comprising periodically recalculating the minimum entropy levels for the plurality of pixels of the photon sensor.

6. The method for generating random numbers according to claim 5, further comprising associating the one of the plurality of extractors with another one of the plurality of pixels based on the recalculated minimum entropy levels.

7. The method for generating random numbers according to claim 1, further comprising:
   comparing each of the calculated minimum entropy levels of one or more pixels with a predetermined threshold; and
   determining that the one or more pixels does not exhibit a minimum entropy level sufficient to generate output bits for a random number if the respective calculated minimum entropy level is below the predetermined threshold.

8. The method for generating random numbers according to claim 7, further comprising associating the one or more pixels that does not exhibit a minimum entropy level with a second extractor of the plurality of extractors, wherein the second extractor does not output the high-entropy bits.

9. The method for generating random numbers according to claim 1, further comprising:
   determining that the one or more pixels is saturated based on the respective calculated minimum entropy level; and
   associating the one or more pixels that is saturated with a second extractor of the plurality of extractors, wherein the second extractor does not output the high-entropy bits.

10. A device for generating random numbers based on an optical process of quantum nature, the device comprising:
    a light source configured to emit photons;
    a photon sensor having a plurality of pixels configured to absorb the photons emitted from the light source; and
    a processor configured to calculate respective minimum entropy levels for the plurality of pixels of the photon sensor and to associating one of a plurality of extractors with at least one of the plurality of pixels based on the calculated minimum entropy level of the at least one pixel,
    wherein the extractor associated with the at least one pixel is configured to generate a number of high-entropy bits for generating a random number.

11. The device for generating random numbers according to claim 10, further comprising:
    an analog-to-digital converter configured to convert an electron signal received from the photon sensor into a voltage; and
    an amplifier configured to amplify the voltage signal to be inputted to the extractor associated with the at least one pixel of the photon sensor.

12. The device for generating random numbers according to claim 10, wherein the extractor generates the number of high-entropy bits comprises generating a number k of high-entropy output bits $y_j$ from a number $1 \prec k$ of lower entropy bits $r_i$.

13. The device for generating random numbers according to claim 10, wherein the processor is configured to calculate the minimum entropy levels by calculating an entropy of a Poisson distribution with a mean equal to an average number of photons absorbed by regions of the plurality of pixels of the photon sensor.

14. The device for generating random numbers according to claim 13, wherein the processor is further configured to periodically recalculate the minimum entropy levels for the plurality of pixels of the photon sensor.

15. The device for generating random numbers according to claim 14, wherein the one of the plurality of extractors is associated with another one of the plurality of pixels based on the recalculated minimum entropy levels.

16. The device for generating random numbers according to claim 10, wherein the processor is further configured to:
    compare each of the calculated minimum entropy levels of one or more pixels with a predetermined threshold; and
    determine that the one or more pixels does not exhibit a minimum entropy level sufficient to generate output bits for a random number if the respective calculated minimum entropy level is below the predetermined threshold.

17. The device for generating random numbers according to claim 16, wherein the one or more pixels that does not exhibit a minimum entropy level is associated with a second extractor of the plurality of extractors and the second extractor is configured to not output the high-entropy bits.

18. The device for generating random numbers according to claim 10, wherein the processor is further configured to:

determine that the one or more pixels is saturated based on the respective calculated minimum entropy level; and associate the one or more pixels that is saturated with a second extractor of the plurality of extractors and the second extractor does not output the high-entropy bits.

19. The device for generating random numbers according to claim 10, wherein the light source is selected from a group of light sources consisting of a light-emitting diode, a laser diode, ambient light, or any other adequate light source emitting photons randomly.

20. The device for generating random numbers according to claim 10, wherein the photon sensor is selected from a group of photon detectors consisting of a CCD camera, a CMOS camera, in particular an image sensor with an array of pixels, or a photon detector having a single photon resolution for generating random numbers.

* * * * *